United States Patent [19]

Kubota et al.

[11] Patent Number: 4,751,509
[45] Date of Patent: Jun. 14, 1988

[54] LIGHT VALVE FOR USE IN A COLOR DISPLAY UNIT WITH A DIFFRACTION GRATING ASSEMBLY INCLUDED IN THE VALVE

[75] Inventors: Keiichi Kubota; Masao Imai, both of Tokyo, Japan

[73] Assignee: NEC Corporation, Japan

[21] Appl. No.: 870,189

[22] Filed: Jun. 3, 1986

[30] Foreign Application Priority Data

Jun. 4, 1985 [JP]  Japan .................. 60-121036
Oct. 11, 1985 [JP]  Japan .................. 60-226241
Dec. 27, 1985 [JP]  Japan .................. 60-296939

[51] Int. Cl.$^4$ .................. G02F 1/133; G09G 3/36
[52] U.S. Cl. .................. 340/784; 340/783; 340/713; 350/347 R; 350/348; 350/351; 350/345; 358/231
[58] Field of Search .................. 340/783, 786, 713, 714, 340/765; 350/351, 347 R, 347 V, 348, 345, 162.19; 358/231

[56] References Cited

U.S. PATENT DOCUMENTS

| | | | |
|---|---|---|---|
| 3,843,231 | 10/1974 | Borel et al. .................. | 350/348 |
| 4,365,869 | 12/1982 | Hareng et al. .................. | 340/784 |
| 4,499,458 | 2/1985 | LeBarre et al. .................. | 340/784 |
| 4,595,260 | 6/1986 | Kubata .................. | 350/351 |
| 4,639,722 | 1/1987 | Urabe et al. .................. | 340/784 |

OTHER PUBLICATIONS

"Low Power Laser-Addressed Liquid Crystal Projection Display Device", Chang et al., *IBM Technical Disclosure Bulletin*, vol. 24, No. 3, Aug. 1981, pp.1570-1572.

Primary Examiner—Howard A. Birmiel
Attorney, Agent, or Firm—Ostrolenk, Faber, Gerb & Soffen

[57] ABSTRACT

In a display unit for use in projecting projection light onto a screen to display a picture, a light valve comprises a diffraction grating assembly for selecting one of chrominance components included in an incident light given through one surface of the light valve. The diffraction grating assembly is divided into a plurality of grating elements arranged to give different colors corresponding to the chrominance components. In addition, a control beam, such as a laser, is incident onto the other surface of the light valve to selectively scan the grating elements and to heat selected ones of the grating elements through an energy converting film. Thus, the incident light is subjected to modulation on the grating elements in accordance with heat energy and emitted through a liquid crystal as controlled light from the light valve. The controlled light is sent as the projection light to the screen.

15 Claims, 8 Drawing Sheets

(A) GRATING ASSEMBLY (B) BEAM SIGNAL (C) GATE SIGNAL

(D) DETECTION SIGNAL

(E) 1st DELAY (F) 2nd DELAY (G) 3rd DELAY (H) CLOCK SIGNAL (I) MEMORY SIGNAL (J) PICTURE SIGNAL (K) CONTROLLING BEAM

LIGHT VALVE FOR USE IN A COLOR DISPLAY UNIT WITH A DIFFRACTION GRATING ASSEMBLY INCLUDED IN THE VALVE

BACKGROUND OF THE INVENTION

This invention relates to a light valve for use in a color display unit which is suitable for image processing by an electronic digital computer, large screen display, and the like.

Such a display unit is used in emitting projection light which is projected on a screen to display a picture. A monochrome display unit is described in an article contributed by Anthony G. Dewey et al to Proceeding of the S.I.D., Volume 19/1 First Quarter 1978, pages 1 to 7, under the title of "Laser-addressed Liquid Crystal Projection Display." According to Dewey et al, the display unit comprises a light valve and has a high resolution, the capability for selective erase, and long-term storage. The light valve is for controlling the projection light.

The light valve has a first and a second principal surface. Incident light is incident onto the first principal surface parallel to an incident optical axis. A laser beam is incident onto the second principal surface and controllably scanned thereon. A part of the laser beam is converted into heat energy in the light valve. The heat energy serves to switch the state of the light valve and to control the incident light in the light valve. The incident light is therefore controlled by the laser beam and is then emitted as controlled light from the first principal surface parallel to an exit optical axis which makes a small angle with the incident optical axis. The controlled light is used as the projection light. The laser beam is used merely because of a high efficiency of the heat conversion. Any other beam may be used so as to be effectively converted to the heat energy. Such a beam will be referred to herein as a controlling beam.

A color display device is disclosed by Keiichi Kubota, one of the present applicants, in Japanese Patent Prepublication No. 107,625 of 1985 which was laid open to public on June 13, 1985. The prepublication is for a Japanese patent application filed by NEC Corporation, the assignee. The color display device is for incident light comprising a plurality of chrominance components. A light valve is included also in the display unit of Kubota and comprises a color filter for dealing with the chrominance components. The color filter comprises a film of either dye or a like organic material. The color filter is therefore not heat resistant. The incident light deteriorates the color filter during a continued use. The color filter therefore has a short life.

SUMMARY OF THE INVENTION

It is therefore an object of the present invention to provide a light valve for use in a color display unit, which light valve is capable of making a display unit project a color picture on a screen and is better heat resistant and has a longer life than a conventional light valve.

Other objects of this invention will become clear as the description proceeds.

A light valve to which this invention is applicable has a first principal surface for incident light and a second principal surface for a controlling beam. The incident light includes a plurality of chrominance components. The light valve comprises energy converting means between the first and the second principal surfaces for locally converting the controlling beam into heat energy, a diffraction grating assembly between the first and the second principal surfaces and supplied with the incident light for selecting one of the chrominance components, namely, color filter, and control means coupled to the energy converting means and the diffraction grating assembly for controlling the incident light in accordance with the heat energy to produce controlled light through the first principal surface depending on the one of the chrominance components.

DESCRIPTION OF THE PREFERRED EMBODIMENTS

Figure 1:
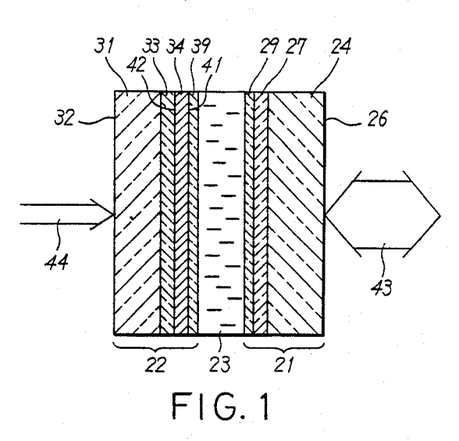
FIG. 1 is a sectional view of a conventional light valve.

Referring to FIG. 1, a conventional light valve will be described for a better understanding of the present invention. The light valve of the type is described in the above-mentioned Dewey et al article and comprises first and second blocks 21 and 22 and a liquid crystal 23 placed therebetween.

The first block 21 includes a front plate 24 of transparent glass. The front plate 24 has a front surface 26 which is referred to herein as a first principal surface. A rear surface of the front plate 24 is covered by a transparent electrode film 27. A front liquid crystal alignment film 29 is placed between the transparent electrode film 27 and the liquid crystal 23.

The second block 22 includes a rear plate 31 which is also made of transparent glass. The rear plate 31 has a rear surface 32 which is referred to herein as a second principal surface. A front surface of the rear plate 31 is covered by an energy converting film 33. A reflective film 34 of aluminium is placed on the energy converting film 33. A rear liquid crystal alignment film 39 is placed between the reflection film 34 and the liquid crystal 23. The reflective film 34 has first and second reflection surfaces 41 and 42. The first reflection surface 41 is in contact with the rear liquid crystal alignment film 39. The second reflection surface 42 is contiguous to the energy converting film 33.

The liquid crystal 23 is smectic which has phase transition smectic-nematic-isotropic according to the temperature. When the smectic liquid crystal is heated and rapidly cooled from isotropic phase, the smectic texture becomes a light-scattering state. The heating and cooling are created by the laser beam. By scanning the laser beam, the information is recorded in the light valve. On the screen, the smectic texture appears as transparent, but the written scattering texture is black. The scattering texture may be erased by applying a.c. field between the transparent electrode film 27 and the refelctive film 34. Each molecule of the liquid crystal 23 is reoriented in accordance with the front and the rear liquid crystal alignment films 29 and 39. It is to be noted that a combination of the liquid crystal 23, the front liquid crystal alignment film 29, the rear liquid crystal alignment film 39, the transparent electrode film 27, and the reflective film 34 is herein referred to as a control unit.

In the above-mentioned light valve, incident light 43 is incident through the first principal surface 26. The incident light 43 reaches the liquid crystal 23 through the front plate 24, the transparent electrode film 27, and the front liquid crystal alignment film 29. When the liquid crystal 23 is in the smectic phase, the incident light passes through the liquid crystal 23 and the rear liquid crystal alignment film 39 to reach the first reflection surface 41 of the reflective film 34 and is reflected as reflected light from the first reflection surface 41 back towards the first principal surface 26. The reflected light is also incident to the liquid crystal 23. Therefore, the reflected light may be referred to also as the incident.

Reflected at the first reflection surface 41, the reflected light passes through the rear liquid crystal alignment film 39, the liquid crystal 23, the front liquid crystal alignment film 29, and the transparent electrode film 27 to reach the front plate 24 and is emitted as a controlled light through the first principal surface 26. The controlled light is projected as a projection light on a screen (not shown) to display a picture.

On the other hand, a laser beam, namely, a controlling beam 44 is projected onto the second principal surface 32 and controllably scanned thereon. The controlling beam 44 passes through the rear plate 31 and reaches the energy converting film 33. A part of the controlling beam 44 is converted to heat energy in the energy converting film 33. The heat energy is transmitted to the liquid crystal 23 through the reflective film 34 and the rear liquid crystal alignment film 39. The liquid crystal 23 is heated by the heat energy. As a result, the liquid crystal 23 is brought into an isotropic phase.

Even if the controlling beam 44 is erased, the liquid crystal 23 is rapidly cooling and remains in a random orientation of the isotropic phase or smectic phase. When put in the smectic phase, the liquid crystal 23 scatters the incident light and the reflected light. In other words, the controlled light is emitted as scattered light from the first principal surface 26. In this case, the controlled light can not be used as the projection light.

According to the above-mentioned light valve, it is impossible to provide a color display unit.

Figure 2:
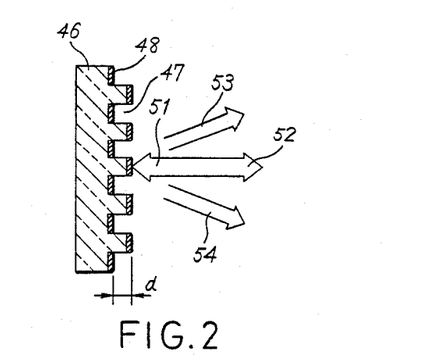
FIG. 2 is a diffraction grating panel for use in describing principles of a diffraction grating assembly which is included in a light valve according to this invention.

Referring to FIG. 2, a diffraction grating panel will be described in order to facilitate an understanding of the principles on which this invention is based.

The diffraction grating panel comprises a base plate 46 having a plurality of indents 47 on a front surface thereof. The indents 47 are rectangular in section to leave a ridge between two consecutive ones of the indents 47. The indents 47 extend vertically of the figure in parallel with one another. A plurality of reflective films 48 are provided on top surfaces of the ridges and bottom surfaces of the indents 47, respectively. The diffraction grating panel has a laminated structure in the manner. It is possible to understand that the reflective films 48 define rulings or lines of the diffraction grating panel.

Incident light 51 is incident towards the reflective films 48. The incident light 51 is reflected from the reflective films 48 as reflected light. In this event, the reflected light is separated by the diffraction grating panel into various diffracted beams, for example, beams of a zeroth, a plus first, and a minus first order indicated at 52, 53, and 54. The diffracted beams 52, 53, and 54 have wavelength distributions which are different from one another. It is to be noted here the wavelength distribution of the zeroth order beam 52 is determined in accordance with depths of the indents 47.

The zeroth order beam 52 has intensity $T(\lambda)$ given for a certain wavelength $\lambda$ by:

$$T(\lambda) = \cos^2(2\pi nd/\lambda), \quad (1)$$

where n represents a refractive index of a medium through which the incident light reaches the reflective films 48 formed on the bottom surfaces of the indents 47 and reflected as the zeroth order beam 52. The intensity $T(\lambda)$ has a normalized maximum value of unity when the depths d of the indents 47 is given by:

$$d = m\lambda/(2n), \quad (2)$$

where m is indicative of a natural number. The intensity $T(\lambda)$ has a normalized minimum value of zero when the depths d of the indents 47 is given:

$$d = (2m+1)\lambda/(4n), \quad (3)$$

where m is indicative of an integer which is not negative.

Figure 3:
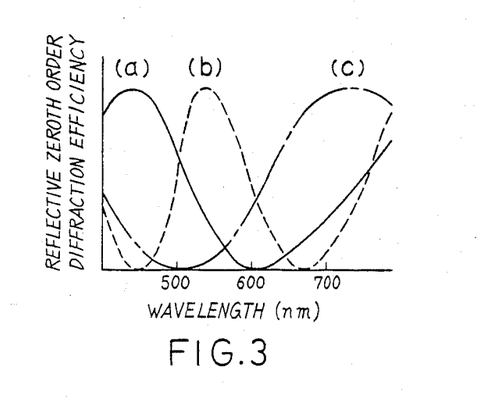
FIG. 3 is a graph representative of a reflective zeroth-order diffraction efficiency of the diffraction grating panel illustrated in FIG. 2.

Turning to FIG. 3, the zeroth order beam 52 has a wavelength distribution which depends on the depth d of the indents 47. A solid line curve (a) represents a first wavelength distribution for the depth d of 290 nm. A dashed line curve (b) represents a second wavelength distribution for the depth d of 520 nm. A dash-dot line curve (c) represents a third wavelength distribution for the depth d of 240 nm. When the refractive index n is equal to 1.5, the first, the second, and the third wavelength distribution represent blue, green, and red, respectively.

Figure 4:
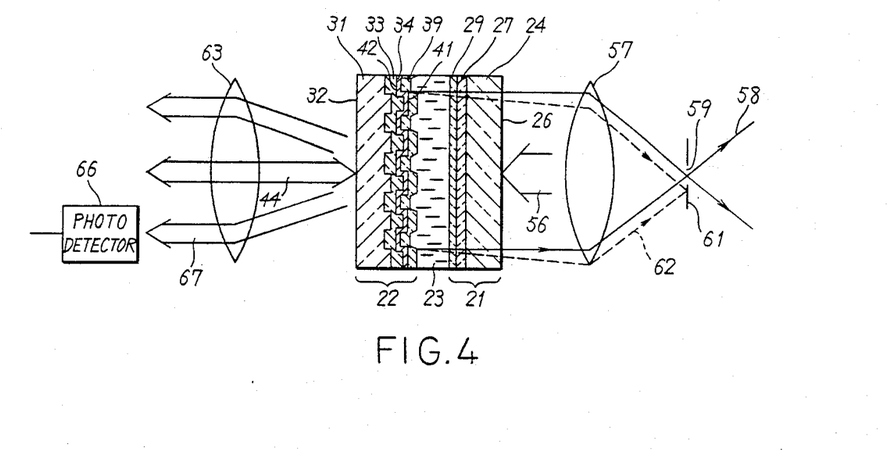
FIG. 4 is a sectional view of a light valve according to a first embodiment of this invention.

Referring now to FIG. 4, a light valve according to a first embodiment of this invention comprises similar parts designated by like reference numerals as in FIG. 1.

The light valve is for use in a color display unit. The light valve comprises a first and a second diffraction grating assembly which will become clear as the description proceeds. For the time being, it may be mentioned that the first and the second diffraction grating assemblies are defined by the first and the second reflection surfaces 41 and 42 of the reflective film 34 of, for example, aluminium. The first and the second diffraction grating assemblies comprise a plurality of grating elements which are in one-to-one correspondence to picture elements of a picture displayed by the color display unit. The grating elements have a plurality of rulings or lines parallel to one another perpendicularly of the figure. The rulings have a grating constant, for example, of 2 microns. For convenience of illustration, the rulings will be schematically illustrated on a much enlarged scale in FIG. 4 and the following figures.

The light valve is for incident light 56 which has a plurality of chrominance components. When the incident light 56 reaches the first diffraction grating assembly, it is separated into a plurality of beams, for example, beams of a zeroth order, a plus first order, and a minus first order in the manner which is described before in conjunction with FIG. 2. The beams are emitted as controlled light through the first principal surface 26 to pass through a condenser lens 57. Only the zeroth order beam depicted at 58 passes through a small hole 59 of an opaque board 61. The other order beam shown at 62 is intercepted by the board 61. The incident light 56 may pass through the small hole 59 and then the condenser lens 57 to be incident onto the first principal surface 26.

On the other hand, a part of the controlling beam 44 passes through the energy converting film 33 and reaches the second diffraction grating assembly to be also separated into a plurality of beams, for example, beams of a zeroth order, a plus first order, and a minus first order in the manner which is described before referring to FIG. 2. The beams are emitted through the second principal surface 32. One of the plus first and the minus first order beams is referred as reflected controlling beam and will later be described more in detail.

Figure 5:
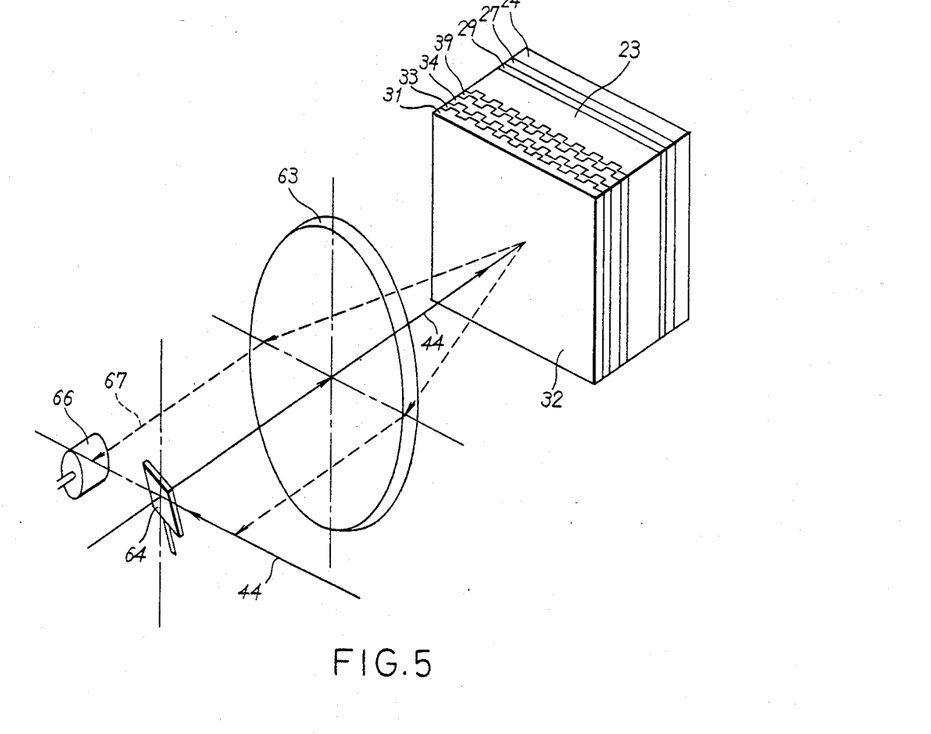
FIG. 5 shows a perspective view of the light valve illustrated in FIG. 4 together with a part of a writing unit.

Referring to FIG. 5 in addition to FIG. 4, the light valve is optically coupled to a writing unit for writing information into the picture. The writing unit comprises a writing lens 63, a beam deflector 64, and a photo detector 66. The controlling beam 44 is incident onto the second principal surface 32 through the writing lens 63 after deflected by the beam deflector 64. The beam deflector 64 is for making the controlling beam 44 scan the second principal surface 32. The reflected controlling beam is indicated at 67. The reflected controlling beam 67 reaches the photo detector 66 through the writing lens 63 and is used to control the controlling beam 44.

In FIGS. 4 and 5, the liquid crystal 23 is of one of octyl cyano biphenyl, decyl cyano biphenyl, a mixture thereof, and the like. The transparent electrode film 27 is of indium tin oxide. Each of the front and the rear liquid crystal alignment films 29 and 39 is of either a high molecular film or an obliquely evaporated silicon monoxide (SiO) film. The energy converting film 33 is of a semiconductor compound of Groups II and VI elements, such as cadmium and tellurium and other light absorbing layer.

Figure 6:
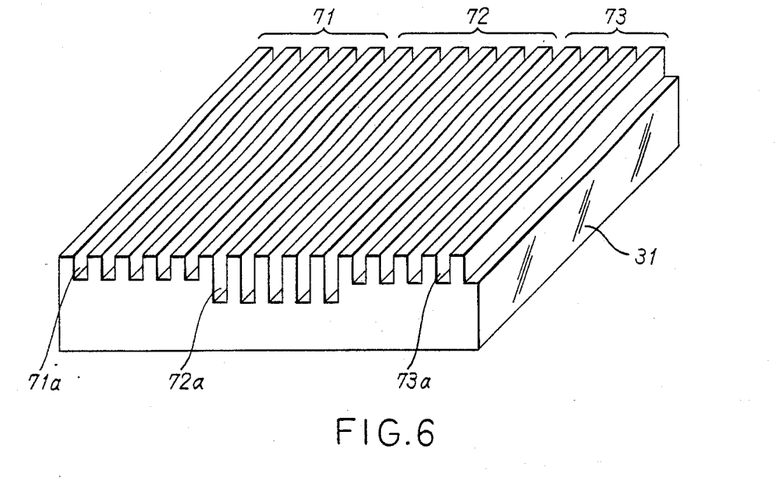
FIG. 6 is a perspective view of a part of a rear plate included in the light valve depicted in FIG. 5.

Referring to FIG. 6 in addition to FIGS. 4 and 5, a part of the rear plate 31 comprises first, second, and third portions 71, 72, and 73 each of which has a size of 10 microns×30 microns. The first portion 71 has a plurality of indents 71a which are 240 nm deep. The second portion 72 has a plurality of indents 72a which are 520 nm deep. The third portion 73 has a plurality of indents 73a which are 290 nm deep. The indents 71a, 72a and 73a are parallel to one another. The indents 71a, 72a, and 73a have a pitch which is decided by the above-mentioned grating constant, namely, 2 microns.

The indents 71a, 72a, and 73a can be formed by applying chemical etching or ion milling to a flat glass plate by the use of a mask of a photoresist. It will be understood that the indents may be formed in any other manner.

The energy converting film 33, the reflection film 34, and the rear liquid crystal alignment film 39 are combined into the rear plate 31 described before. As a result, the above-mentioned grating elements are included in the second block 22.

Each of the first through the third portions 71 to 73 serves as a base member to form a grating element. Each of grating elements will hereafter be called a first, a second, a third grating element. The controlled light is produced by the first, the second, and the third grating elements of the first diffraction grating assembly. As will be understood from the description of FIG. 3, the first, the second, and the third grating elements serve to provide red, green, and blue on a screen, respectively. The reflected controlling beam 67 is provided by the first, the second, and the third grating elements of the second diffraction grating assembly.

Figure 7:
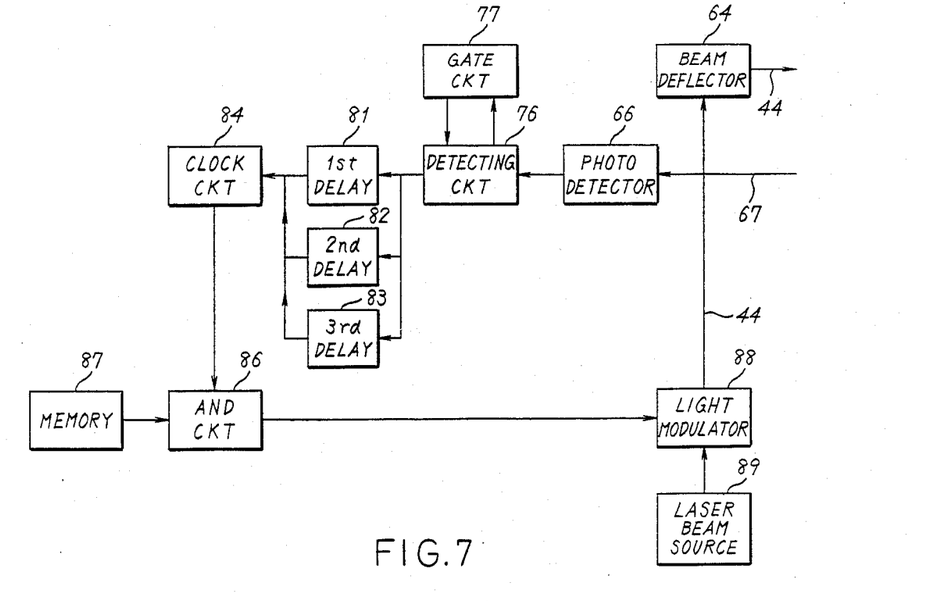
FIG. 7 is a block diagram of the writing unit which is mentioned in connection with FIG. 5.
Figure 8:
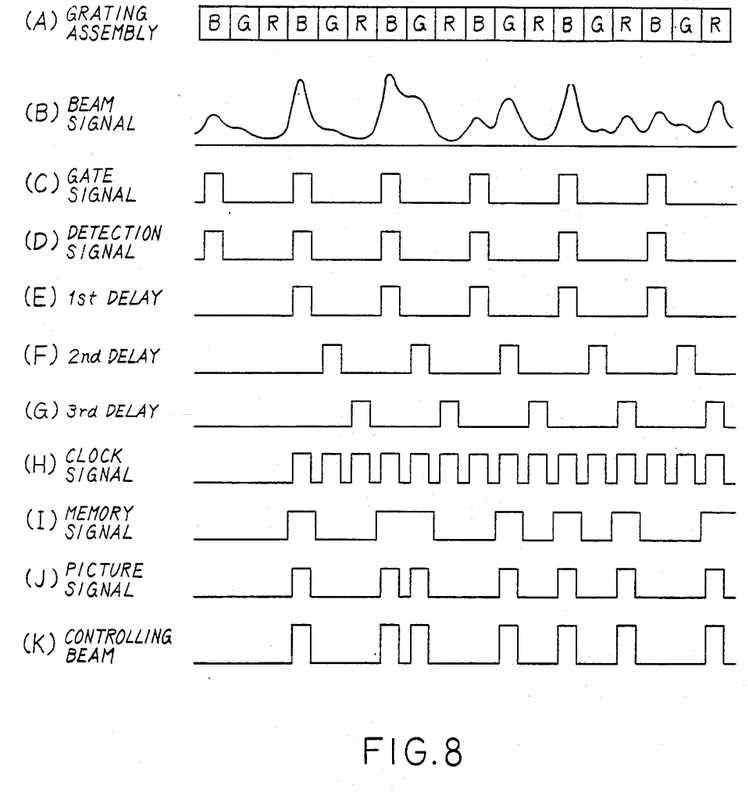
FIG. 8 is a time chart for use in describing operation of the writing unit illustrated in FIG. 7.

Referring to FIGS. 7 and 8 in addition to FIG. 5, the writing unit is for controlling the controlling beam 44 in accordance with the reflected controlling beam 67. The reflected controlling beam 67 has the light intensity which depends on the plus first order beam emitted through the second principal surface 32 of the light valve. The plus first order beam has diffraction efficiency which depends on the depth of the indents. In this event, the depth of the rulings is designed so that the plus first order beam of the third grating element has a larger diffraction efficiency than those of the first or the second grating elements.

Prior to writing operation, namely, laser-addressing operation of the information, provisional scanning operation is carried out outside of a usual picture area. For example, a preselected number of the grating elements is preliminarily scanned by the controlling beam 44 on the screen. The preselected number of the grating elements may be at least one set of the grating elements. In FIG. 8(A), three leftmost ones of the grating elements for blue B, green G, and red R are scanned during the provisional operation. Subsequently, the provisional scanning operation is followed by the writing operation. During the writing operation, the controlling beam 44 is enhanced in luminous energy in comparison with that of the provisional scanning operation. As a result, the reflected controlling beam 67 is emitted through the second principal surface 32 of the light valve and is supplied to the photo detector 66.

The photo detector 66 is responsive to the reflected controlling beam 67 to produce a beam signal (FIG. 8(B)) of a level determined by intensity of the reflected controlling beam 67. The beam signal is supplied to a level detecting circuit 76. When the beam signal has a level higher than that of a threshold level predetermined for the level detecting circuit 76, a detection signal (FIG. 8(D)) is supplied to a gate circuit 77. Namely, the detection signal is produced only at a time when the reflected controlling signals 67 is produced in the third grating element. The gate circuit 77 is responsive to the detection signal to produce a periodical succession of gate signals (FIG. 8(C)).

The gate signal succession is sent through the level detecting circuit 76 to first, second, and third delay circuits 81, 82, and 83 of delay times which are different from one another. The first, the second, and the third delay circuits 81, 82, and 83 are for producing a first, a second, and a third delayed signal (FIGS. 8(E), (F), (G)) in accordance with the delay times. The delay signals are supplied to a clock circuit 84 and are combined together into a succession of writing clock signals (FIG. 8(H)) which correspond to the picture elements, respectively. The writing clock signal succession is sent to an AND circuit 86.

The writing unit further includes in a memory 87 for storing a succession of picture data in accordance with the order of scanning. A memory output signal or an original picture signal (FIG. 8(I)) is sent from the memory 87 to the AND circuit 86. The memory output signal carries the picture data succession. A picture signal is sent from the AND circuit 86 to a light modulator 88. An original laser beam is emitted from a laser beam source 89 to the light modulator 88. The light modulator 88 is for modulating the original laser beam into the controlling beam 44 in response to the picture signal (FIG. 8(J)). Thus, the controlling beam 44 (FIG. 8(K)) is controlled by the writing unit so as to exactly reach each one of grating elements of the second diffraction grating assembly.

Figure 9:
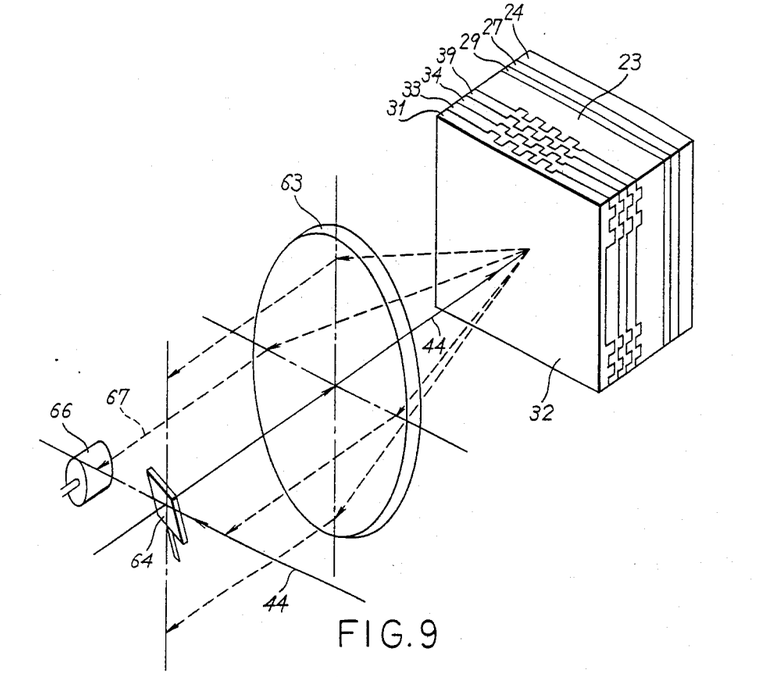
FIG. 9 is a perspective view of a light valve according to a second embodiment of this invention and a part of a writing unit.
Figure 10:
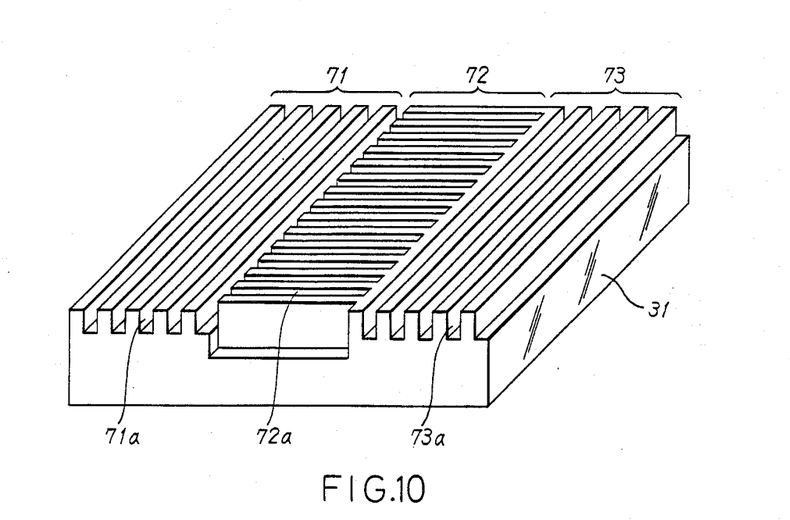
FIG. 10 is a perspective view of a rear plate included in the light valve shown in FIG. 9.

Referring now to FIGS. 9 and 10, a light valve according to a second embodiment of this invention comprises similar parts designated by like reference numerals. The rear plate 31 is modified as regards the indents 72a of the second portion 72. More particularly, the indents 72a are extended in a direction orthogonal to that of the indents 71a and 73a of the first and the third portions 71 and 73. Therefore, the rulings of the second grating element are orthogonal to those of the first and the third grating elements. As a result, the second grating element produces a plus first and a minus first order beam clearly separated from the other beams. It will be understood that the photo detector 66 can be placed to receive the reflected controlling beam 67 which may be one of the plus first and the minus first order beams that is emitted from a specific grating element, namely, the second grating element.

Figure 11:
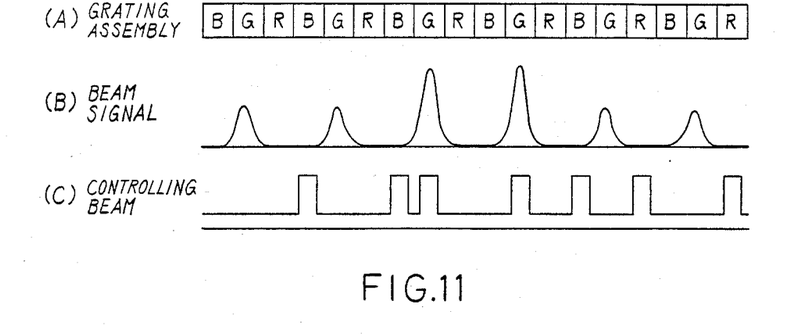
FIG. 11 is a time chart for use in describing writing operation of the writing unit partly illustrated in FIG. 9.

With the light valve being illustrated, the writing unit becomes simple. This is because the reflected controlling beam 67 is produced depending on only the second grating element to be supplied to the photo detector 66 as clearly understood from the beam signal in FIG. 11(B).

Figure 12:
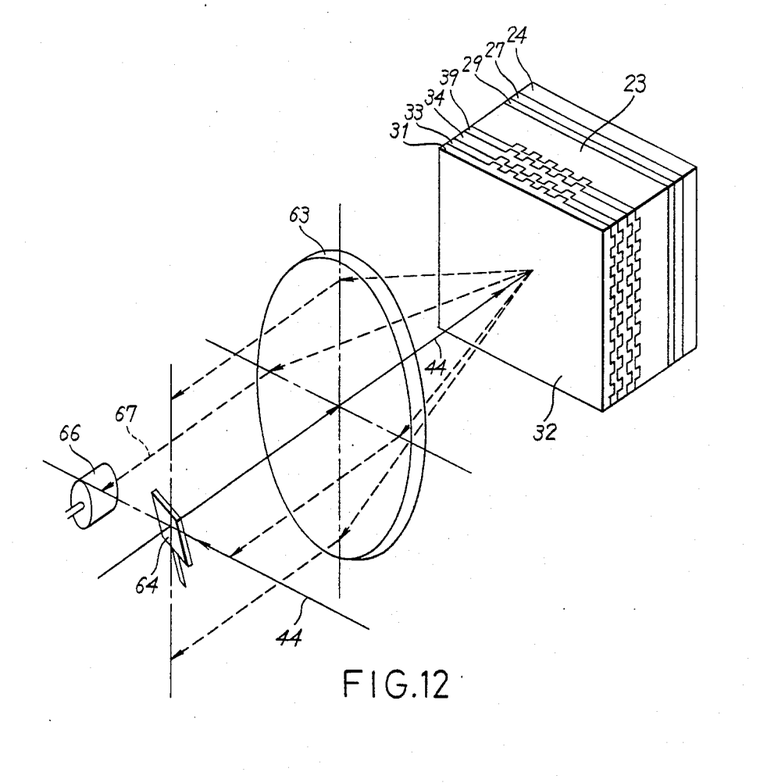
FIG. 12 is a perspective view of a light valve according to a third embodiment of this invention and a part of a writing unit.
Figure 13:
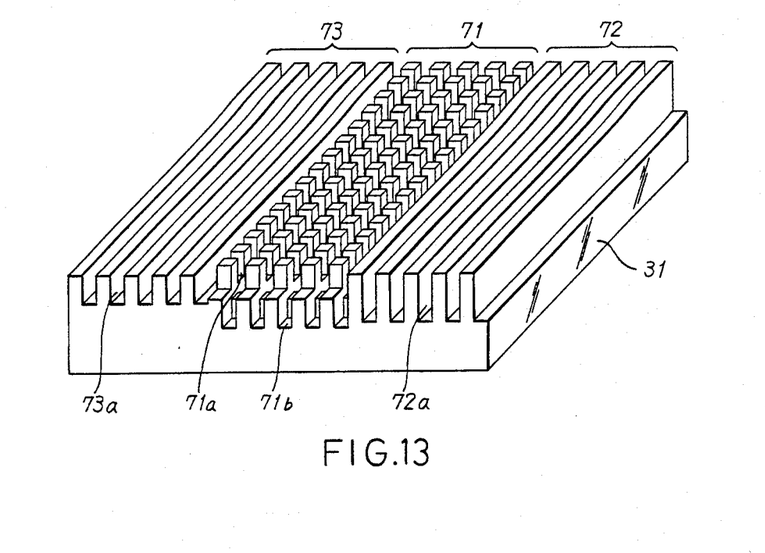
FIG. 13 is a perspective view of a rear plate included in the light valve of FIG. 12.

Referring to FIGS. 12 and 13, a light valve according to a third embodiment of this invention comprises similar parts designated by like reference numerals. The rear plate 31 is modified as regards the first portion 71. In detail, the first portion 71 has first and second indents 71a and 71b. The first indents 71a are extended in a first predetermined direction orthogonal to a second predetermined direction in which the indents 72a and 73a of the second and the third portions 72 and 73 are extended. Each of the first indents 71a is 240 nm deep. On the other hand, the second indents 71b are transversely extended across the first indents 71a. The second indents 71b are formed by applying the chemical etching and so forth after forming the first indents 71a. Each of the second indents 71b is 410 nm deep. Therefore, the rulings of the first grating element intersect one another.

Figure 14:
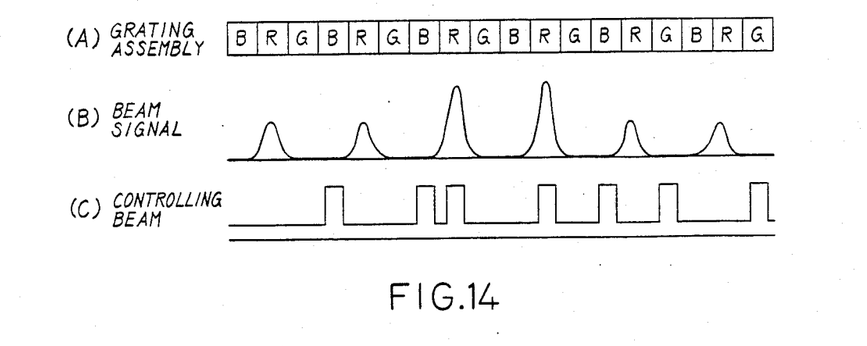
FIG. 14 is a time chart for use in describing writing operation of the writing unit partly illustrated in FIG. 12.

With the first grating element of the structure being illustrated, it is possible to improve chrominance of the picture displayed on the screen, as shown in FIG. 14. In addition, the reflected controlling beam has an increased luminous energy. This is because the third grating element has high diffraction efficiency.

Although the first grating element alone is modified as shown in FIGS. 12 and 13, it will be understood that either the second or the third grating element may be similarly modified.

Figures 15, 16:
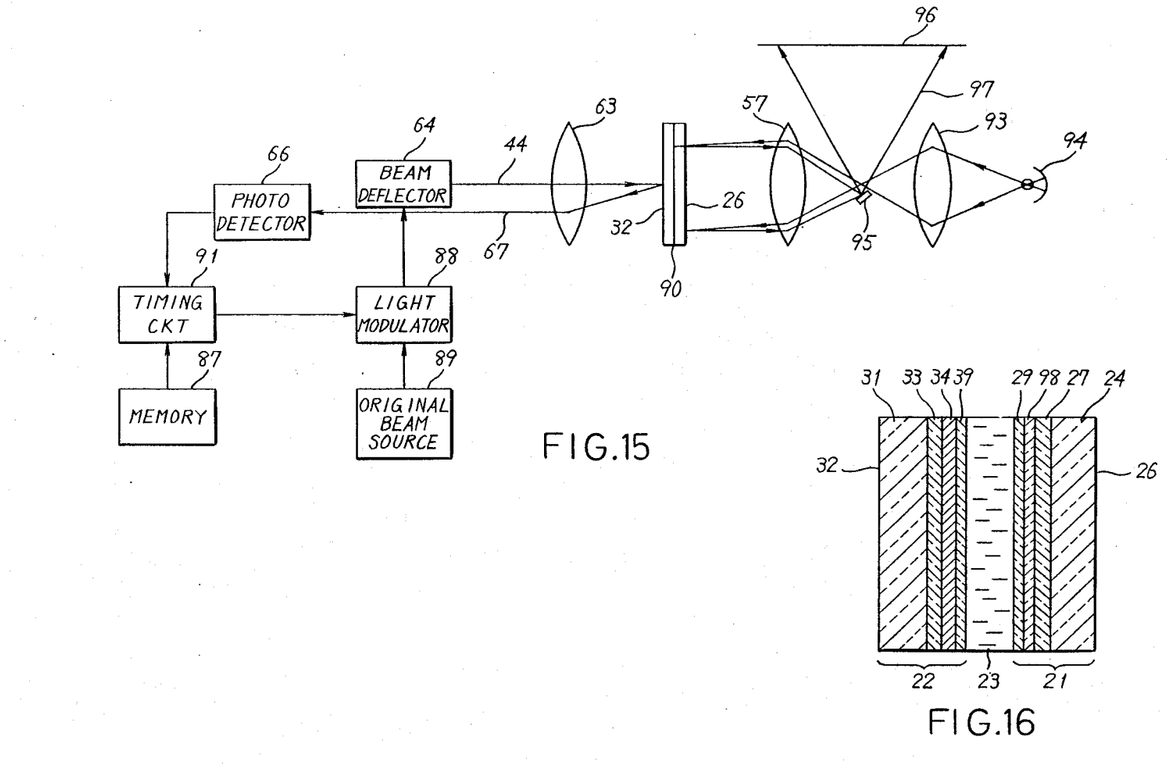
FIG. 15 shows a schematic side view of a display device including the light valve according to this invention and a block diagram of a writing unit.
FIG. 16 is a sectional view of a light valve according to a fourth embodiment of this invention.

Referring to FIG. 15, a display device comprises similar parts designated by like reference numerals. The display unit includes a light valve 90 which may be whichever of the light valves illustrated with reference to FIGS. 9 and 12. Therefore, the reflected controlling beam 67 is emitted from the second principal surface 32 depending on only one of the first, the second, the third grating elements of the light valve 90. When the reflected controlling beam 67 is received by the photo detector 66, a beam signal is sent from the photo detector 66 to a timing circuit 91. A memory output signal is also sent from the memory 87 to the timing circuit 91. The memory output signal carries a succession of picture data stored in the memory 87. The timing circuit 91 sends a picture signal to the light modulator 88 in accordance with the beam signal and the memory output signal. As will be understood in the description relating to FIG. 7, an original laser beam is emitted from the laser beam source 89 and is modulated into the controlling beam 44 in the light modulator 88 in response to the picture signal.

By the way, the display unit comprises a projection lens 93 and a reflective mirror 95. The projection lens 93 is for condensing original light emitted from a light source 95. The original light passes through the projection and the condenser lenses 93 and 57 and is incident as incident light onto the first principal surface 26 of the light valve 90. As will be understood from the foregoing description, the light valve 90 produces controlled light which is controlled depending on the controlling beam 44. The controlled light passes through the condenser lens 57 and is deflected by the reflective mirror 94 towards a screen 96 as projection light 97. As a result, the display unit is capable of displaying the color picture on the screen 96.

Referring to FIG. 16, a light valve according to a fourth embodiment of this invention comprises similar parts designated by like reference numerals. The light valve comprises a grating member 98 between the transparent electrode film 27 and the front liquid crystal alignment film 29. The grating member 98 serves as the first diffraction grating assembly.

With this structure, the incident light travels through the grating member 98 towards the reflective film 34 and returns back through the grating member 98 again to provide the controlled light in a manner similar to that illustrated in FIG. 4.

In this event, the controlling beam 44 is reflected by the reflective film 34 without any diffraction like in FIG. 1.

What is claimed is:

1. A light valve having a first principal surface for receiving incident light and a second principal surface for receiving a controlling beam, said incident light including a plurality of chrominance components, said light valve comprising:

energy converting means between said first and said second principal surfaces for locally converting said controlling beam into heat energy;

a diffraction grating assembly between said first and said second principal surfaces and supplied with said incident light for selecting one of said chrominance components; and controlling means coupled to said energy converting means and said diffraction grating assembly for controlling said incident light in accordance with said heat energy to produce controlled light through said first principal surface depending on said one of the chrominance components.

2. A light valve as claimed in claim 1, wherein said diffraction grating assembly has rulings parallel to one another.

3. A light valve as claimed in claim 1, wherein said diffraction grating assembly comprises grating elements each of which has rulings extended in a predetermined direction and additional grating elements each of which has rulings orthogonal to said predetermined direction.

4. A light valve as claimed in claim 1, wherein said diffraction grating assembly comprises a plurality of grating elements each of which has longitudinal rulings and transverse rulings, said longitudinal and said transverse rulings being orthogonal to one another.

5. A light valve as claimed in claim 1, wherein said control means comprises:

a liquid crystal having a first and a second predetermined phase;

first selection means coupled to said energy converting means and said liquid crystal and responsive to said heat energy for selecting one of said first and said second predetermined phases of the liquid crystal; and second selection means coupled to said liquid crystal for selecting the other one of said first and said second predetermined phases of the liquid crystal.

6. A light valve as claimed in claim 5, wherein said control means further comprises reflection means between said second principal surface and said liquid crystal for reflecting said incident light towards said liquid crystal.

7. A light valve as claimed in claim 5, wherein said diffraction grating assembly is placed between said second principal surface and said liquid crystal.

8. A light valve as claimed in claim 5, wherein said diffraction grating assembly is placed between said first principal surface and said liquid crystal.

9. A light valve as claimed in claim 1, further comprising reflection means between said energy converting means and said first principal surface for reflecting the controlling beam having passed said energy converting means into a reflected controlling beam to be outwardly emitted through said second principal surface.

10. A light valve as claimed in claim 9, further comprising an additional diffraction grating assembly between said reflection means and said energy converting means and supplied with the controlling beam having passed said energy converting means for producing said reflected controlling beam.

11. A display unit for use in emitting projection light which is projected on a screen to display a picture, said display device comprising a light valve having a first principal surface for receiving incident light and a second principal surface for receiving a controlling beam, said incident light including a plurality of chrominance components, said light valve comprising:

energy converting means between said first and said second principal surfaces for partially converting said controlling beam into heat energy;

a diffraction grating assembly between said first and said second principal surfaces and supplied with said incident light for selecting one of said chrominance components; and control means coupled to said energy converting means and said diffraction grating assembly for controlling said incident light in accordance with said heat energy to supply controlled light to said screen through said first principal surface depending on said one of the chrominance components.

12. A display unit as claimed in claim 11, said light valve further comprising reflection means between said energy converting means and said first principal surface for reflecting the controlling beam having passed said energy converting means into a reflected controlling beam to be outwardly emitted through said second principal surface.

13. A display unit as claimed in claim 12, said light valve further comprising an additional diffraction grating assembly between said reflection means and said energy converting means and supplied with the controlling beam having passed said energy converting means for producing said reflected controlling beam.

14. A display unit as claimed in claim 13, further comprising:

writing means responsive to an input beam and an original picture signal representative of said picture for producing said controlling beam modulated by said original picture signal with reference to said input beam; and means optically coupled to said writing means and said light valve for supplying said reflected controlling beam emitted from said light valve to said writing means as said input beam.

15. A method of successively addressing a light valve by the use of a controlling beam to project projection light onto a screen and to display a picture, said light valve having a first principal surface for receiving incident light and a second principal surfacing for receiving said controlling beam, said incident light including a plurality of chrominance components, said light valve comprising energy converting means between said first and said second principal surfaces for partially converting said controlling beam into heat energy, a diffraction grating assembly between said first and said second principal surfaces and supplied with said incident light for selecting one of said chrominance components, control means coupled to said energy converting means and said diffraction grating assembly for controlling said incident light in accordance with said heat energy to supply controlled light to said screen through said first principal surface depending on said one of the chrominance components, reflection means between said energy converting means and said first principal surface for reflecting the controlling beam having passed said energy converting means into a relfected controlling beam to be outwardly emitted through said second principal surface, and an additional diffraction grating assembly between said reflection means and said energy converting means and supplied with the controlling beam having passed said energy converting means for the producing said reflected controlling beam, said method comprising the steps of:

detecting said reflected controlling beam to produce a beam signal;
processing said beam signal to produce an intermittant succession of clock signals;
producing an original picture signal representative of said picture;
processing said original picture signal into a picture signal in response to said clock signal succession; and
modulating an original laser beam by said picture signal into said controlling beam.

* * * * *